(12) United States Patent
Giovenzana et al.

(10) Patent No.: US 7,446,968 B2
(45) Date of Patent: Nov. 4, 2008

(54) METHOD FOR USING A MINIMUM LATENCY LOOP FOR A SYNCHRONIZATION SYSTEM IN A HARD DISK DRIVE

(75) Inventors: Davide Giovenzana, Monza (IT); Angelo Dati, Pavia (IT); Augusto Andrea Rossi, Pavia (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 435 days.

(21) Appl. No.: 11/188,391

(22) Filed: Jul. 25, 2005

(65) Prior Publication Data

US 2006/0023332 A1 Feb. 2, 2006

(30) Foreign Application Priority Data

Jul. 30, 2004 (EP) .................. 04425589

(51) Int. Cl.
*G11B 5/09* (2006.01)
(52) U.S. Cl. .................... 360/51
(58) Field of Classification Search .............. None
See application file for complete search history.

(56) References Cited

U.S. PATENT DOCUMENTS

| | | | |
|---|---|---|---|
| 5,835,295 A | 11/1998 | Behrens | 360/51 |
| 6,108,151 A * | 8/2000 | Tuttle et al. | 360/51 |
| 6,208,481 B1 | 3/2001 | Spurbeck et al. | 360/65 |
| 2002/0021519 A1* | 2/2002 | Rae | 360/51 |
| 2004/0071234 A1* | 4/2004 | Li | 375/341 |

FOREIGN PATENT DOCUMENTS

| | | |
|---|---|---|
| EP | 0777211 | 6/1997 |
| EP | 1274071 | 1/2003 |

OTHER PUBLICATIONS

Spurbeck et al., Interpolated Timing Recover for Hard Disk Drive Read Channels, Communicaitons, 1997, ICC '97 Montreal, Towards the Knowledge Millennium, IEEE International Conference on Montreal, Jun. 8-12, 1997, pp. 1618-1624.

* cited by examiner

*Primary Examiner*—Joseph Feild
*Assistant Examiner*—Dan I Davidson
(74) *Attorney, Agent, or Firm*—Lisa K. Jorgenson; Allen, Dyer, Doppelt, Milbrath & Gilchrist, P.A.

(57) ABSTRACT

The method and architecture improve the robustness of a synchronization system through a minimum latency loop, for Hard Disk Drives (HDD), for example, wherein synchronous detection processing is performed for timing recovering of a correct sampling phase and frequency and by a first acquisition step of a known preamble signal pattern, for generating a timing periodic signal, followed by a second tracking step, for recovering phase, frequency and gain sampling errors of the synchronization signal including a header followed by an unknown data content. Advantageously, a feedback loop including a numeric preamble generator (NPG) is provided for obtaining a reduced latency in the acquisition phase. The NPG stores preamble values for different phase offset.

14 Claims, 9 Drawing Sheets

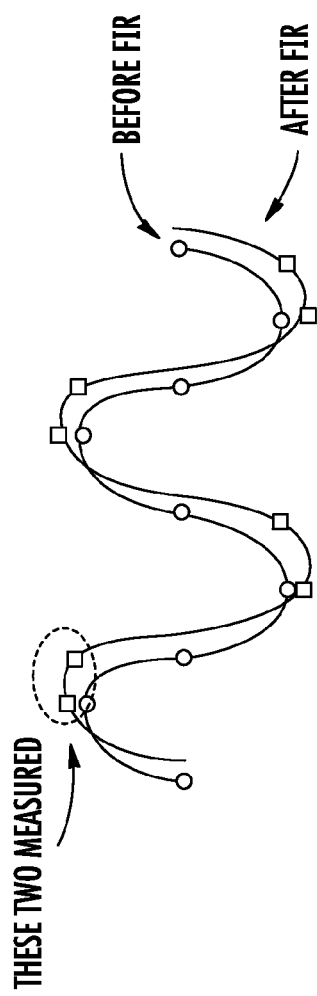

METHOD FOR USING A MINIMUM LATENCY LOOP FOR A SYNCHRONIZATION SYSTEM IN A HARD DISK DRIVE

FIELD OF THE INVENTION

The present invention relates to synchronization systems, such as for Hard Disk Drives (HDD), for example, and more particularly, to synchronization systems using a minimum latency loop.

BACKGROUND OF THE INVENTION

As is known in this specific technical field, a synchronization process is used to recover a correct sampling phase and frequency in each communication system where a synchronous detection is performed. For instance, in hard disk drive applications the timing recovery is accomplished by splitting the process in two main stages, a first stage called "acquisition" and a second stage called "tracking".

In the first acquisition stage, a known pattern, rich in timing information and called the "preamble", generates a periodic signal. The recovery process of phase, frequency and gain may be started given that the expected readback waveform is known beforehand. In the second tracking stage the header is followed by the information content, that is unknown. Once this data is detected, the loops can rely on the estimated bits to compensate for the distortions on the readback signal.

The structure of a data sector is depicted in FIG. 1, wherein the information part, indicated by "data", is sandwiched between additional fields. Each data sector may include the following fields. 4T Preamble: repetitive signal of period 4T, obtained by writing several times the sequence "1100" (where 1 and 0 refer the two media magnetization states), this preamble is needed to start both amplitude and synchronization recovery. Sync mark: which is a field indicating the start of user data. Data: which is an information field, generally protected by error correction codes with high rate and information part equal to the current standard for the operating system (e.g. 512 user symbols of 8 bits per symbol). Pad: is an additional field for flushing the data through the pipeline and for separating the sectors from each other.

A second order PLL is generally implemented in the HDD industry, such that it's possible to recover phase and frequency sampling errors. Two main approaches are adopted in the current techniques. One approach includes tracking the synchronization error via a PLL that controls the analog to digital converter, such that the readback signal is synchronously sampled respect to the written information. Another approach includes recovering the synchronization errors in the reading chain with a digital second order PLL, via a digital filter that works as phase interpolator.

For both techniques a critical parameter is the latency of the loop. Any loop delay will affect loop performance, and in particular the maximum acquisition speed that does not jeopardize PLL stability. High delays narrow the PLL stability region, forcing usage of longer settling times and thus reducing the format efficiency. In this respect, reference is made to the article by J. W. M. Bergmans: "Effect of loop delay on stability of discrete-time PLL," IEEE Trans. Circuits Syst. I, vol. 42, pp. 229-231, April 1995.

The preamble length is determined by testing the acquisition response under a set of operating conditions with a known statistical distribution. The goal is to minimize the probability of either not acquiring properly or loosing timing lock over the frame because of poor timing identification over the header (preamble) field. This event is customarily denoted as 'loss of lock' (LOL).

From basic PLL theory, the LOL likelihood decreases with increasing preamble length. On the other hand the longer the preamble, the smaller the disk surface available for user data. The complex loop structure needed to perform a reliable synchronization estimate in poor signal-to-noise (SNR) conditions is implemented with difficulty at the required data rates in an HDD system, and latency is generally sacrificed to system reliability.

As loop latency is increased, more preamble is necessary in the acquisition phase to result in a loss of lock probability comparable with the sector retry rate. The first approach becomes critical if the equalization process is not closed in the analog domain, before the ADC converter. A criterion in choosing the equalizer structure is flexibility to enable the read path to adapt to widely different application scenarios. Choosing a digital finite-impulse-response (FIR) structure is generally preferable for implementation area, speed and technological reasons.

The delay in FIR outputs calculation contributes to the timing loop latency using the first approach, while it doesn't affect the other approach. In FIG. 2 the first approach is depicted. ADC is the analog to digital converter, FIR is the digital finite impulse response filter for equalizing, PD denotes the phase detector, LF the second order proportional-integrative loop filter, Acc is an integrator, while the complex of PLL and Mux/Phase Interpolator moves the sampling period of the analog to digital converter ADC.

In FIG. 3 the second approach is depicted. The same components of the previous approach are shown in the same positions. Differently from the first approach, in this approach a digital phase interpolation is performed via FIR filtering. It is noted that in FIG. 3 the FIR filter can still be moved inside the timing recovery loop.

FIG. 4 shows an alternative approach, know as "Tintoretto", for timing loop recovery in current HDD Read/Write channels. This approach is an improvement of the above second approach. Since the writing and reading clocks are not synchronous to each other, the frequency difference needs to be compensated. As data stream is sampled with a fixed clock, it is necessary to build a continuous flux of samples, eventually destroying redundant samples (oversampling exception) or interpolating additional samples (undersampling exception).

In the approach shown in FIG. 4, a dynamic buffer is provided at the phase interpolator output. The average throughput at the dynamic buffer input is at the ADC frequency, while the output throughput is uniform at the write clock frequency.

Again, in the acquisition phase, the pattern is known beforehand: a monochromatic replica of the equalized and timing error free preamble pattern is generated as reference for the phase detector input (Preamble Generator). In tracking, the information bits are detected by a reduced complexity Viterbi detector. Different loop gains are implemented, with the purpose of increasing the loop bandwidth in acquisition (reduced latency) with respect to tracking (longer latency). While being advantageous in many aspects, this last approach still has a relatively long latency loop in the acquisition phase.

SUMMARY OF THE INVENTION

The purpose of the present invention is to improve the sector format. By reduction of the timing loop latency in the acquisition phase, for the same reliability of synchronization recovery, less preamble samples are necessary.

The approach of the invention is based on the following: during acquisition, instead of interpolating the samples to track the timing error-free references, like in the prior Tintoretto approach, the references follow the analog to digital conversion samples. As the preamble can be efficiently characterized by its Discrete Fourier Transform (DFT) component at 25% of the sampling rate, it is not necessary to use timing interpolation and equalization to track the timing error-free references. Moreover, the inventive method does not rely on any detailed equalization feature.

More specifically, the invention relates to a method wherein synchronous detection processing is performed to recover a correct sampling phase and frequency and by a first acquisition step of the a known preamble signal pattern, for generating a periodic signal, followed by a second tracking step, for recovering phase, frequency and gain of the synchronization signal including a header followed by an unknown information content.

BRIEF DESCRIPTION OF THE DRAWINGS

The features and advantages of a method according to the invention are made apparent by the following description of an embodiment thereof, given by way of non-limiting example with reference to the accompanying drawings.

FIGS. 10 and 11 are schematic diagrams illustrating digital arrays of FIR memory configurations in two different steps of the method according to the invention;

FIG. 12 is a schematic diagram illustrating a measured phase and amplitude shift obtained according to the outputs of the FIR block according to the invention;

DETAILED DESCRIPTION OF THE PREFERRED EMBODIMENTS

Figure 5:
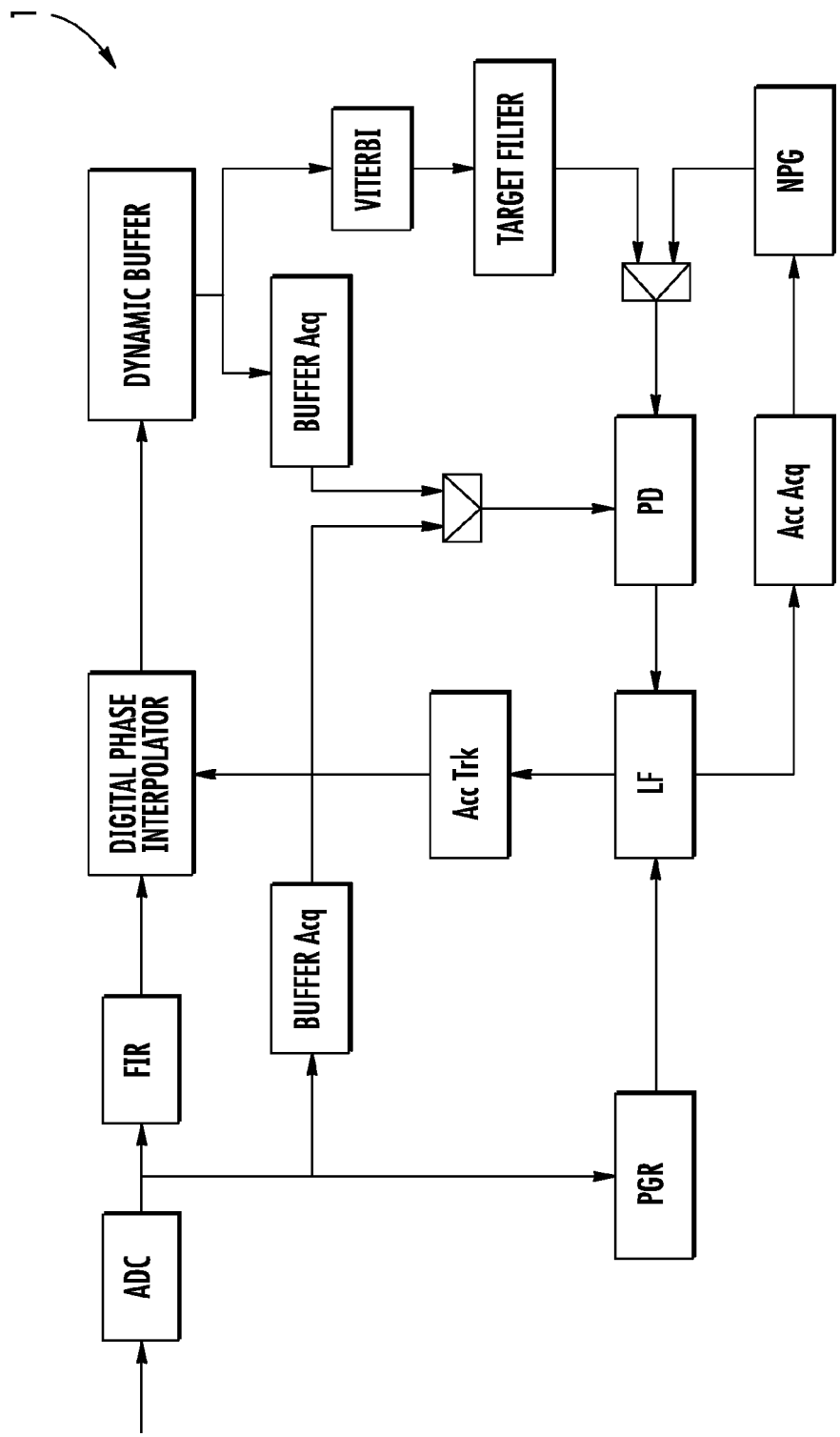
FIG. 5 is a schematic diagram illustrating an architecture according to the present invention for improving the robustness of synchronization phase in synchronous signal detection in the Hard Disk Drive through a minimum latency loop.
Figure 6:
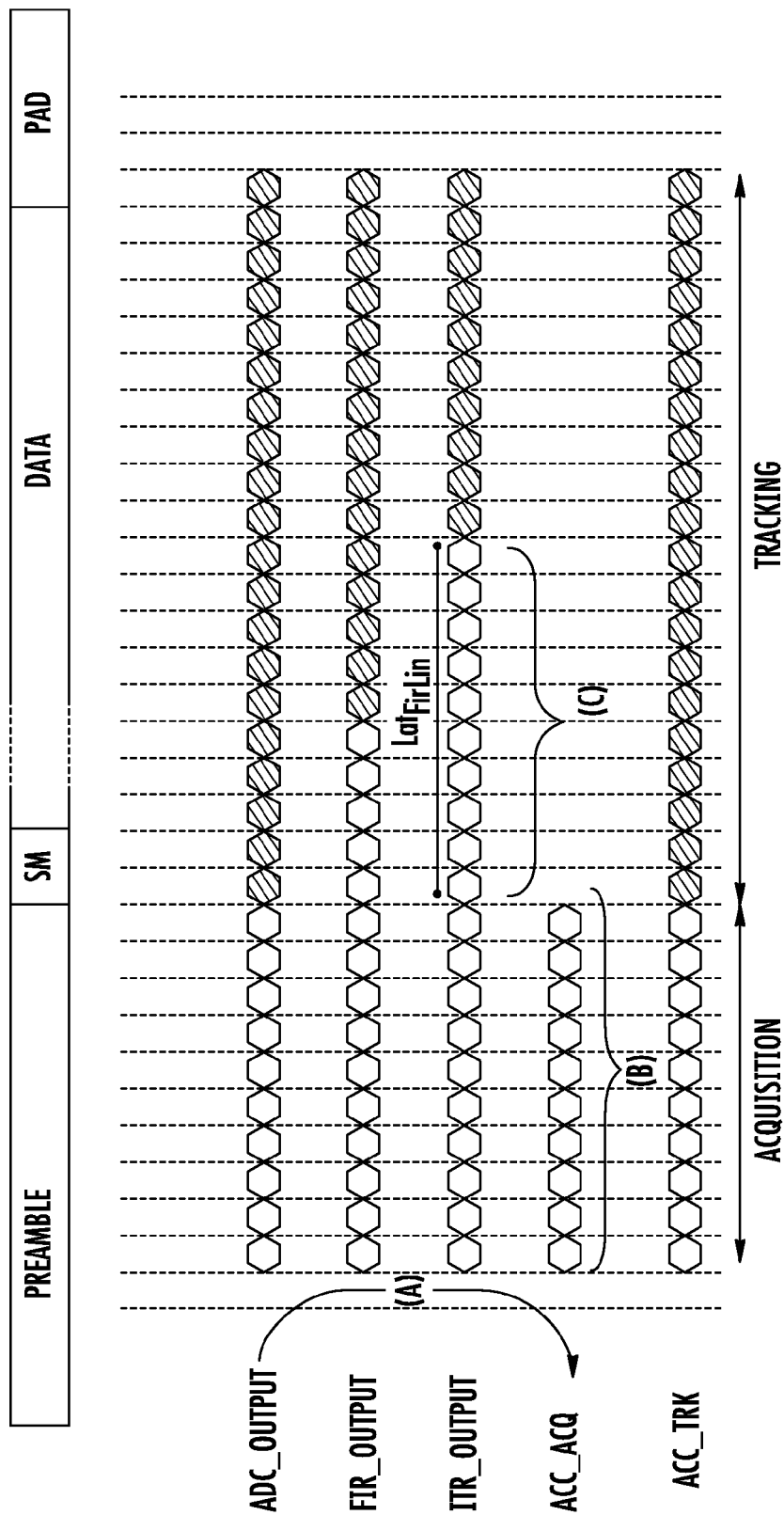
FIG. 6 is a timing diagram illustrating synchronization loops timing in the architecture of the present invention.
Figure 13:
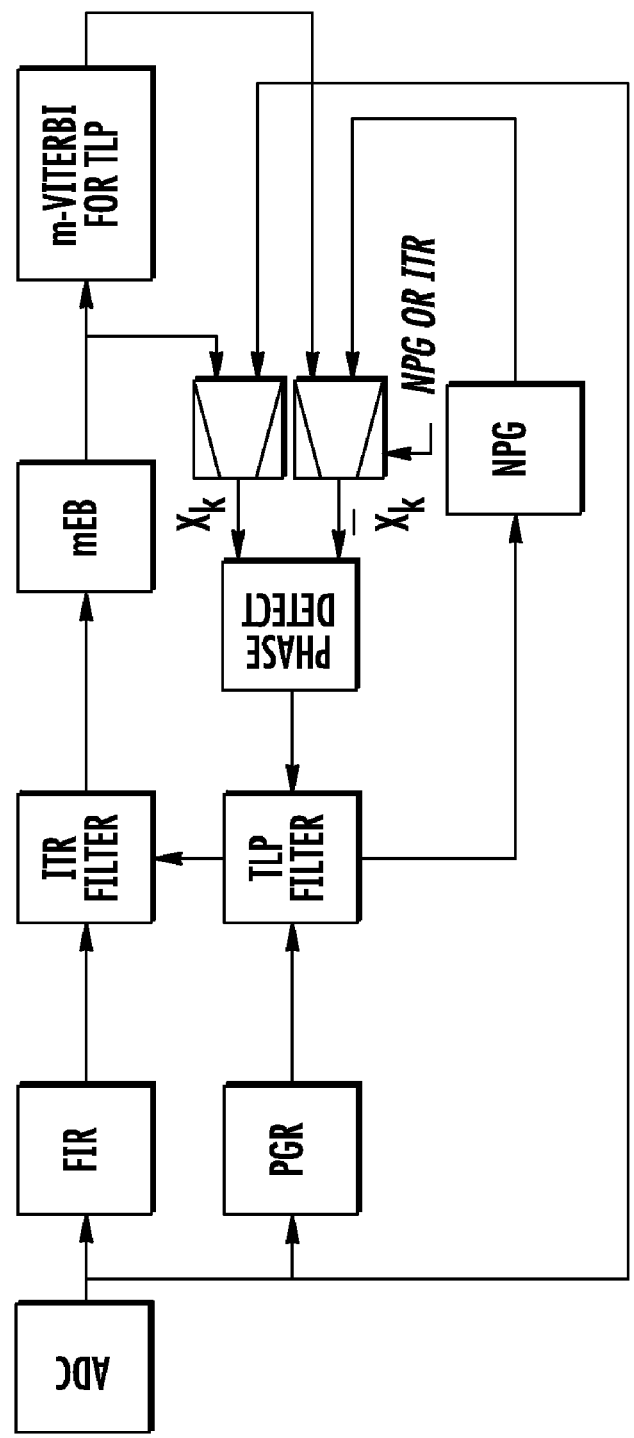
FIG. 13 is a more schematic view of the architecture of the present invention and according to the detailed view of FIG. 5.

With reference to the drawings figures, and to the specific example of FIGS. 5 and 13, a method according to the present invention is disclosed for improving the robustness of synchronization system through a minimum latency loop, for instance in Hard Disk Drive applications. The method will be disclosed making reference to an architecture of an improved synchronization system.

The method is performed in such a new architecture 1 for synchronous signal detection, including synchronization processing to recover phase and frequency sampling errors. The block diagram of the architecture 1 is depicted in FIG. 5, wherein the blocks: Buffer Acq; PGR; NPG and Acc Acq are used in the acquisition phase; the blocks: Viterbi, Buffer Trk, Target Filter and Acc Trk are used in the tracking phase; while the blocks PD and LF are used for both phases.

The architecture 1 comprises an analog to digital converter ADC, receiving the signal to be detected, having an output linked to the input of a digital finite impulse response filter (FIR) for performing an equalizing phase. However, it's important to note that the present invention can be applied regardless of the position of the digital FIR. Downstream to the FIR filter there is a Digital Phase Interpolator producing an output for a Dynamic Buffer. The output of the analog to digital converter ADC is picked up as input of a PGR block for performing a provisional estimation of phase and gain.

The output of the PGR block is applied as initial value in Acc Acq. The filter block LF can be a second order proportional-integrative loop filter, whose input is sourced from a phase detector PD. The phase detector PD is inserted in a feedback loop including a read only memory (ROM) named NPG (Numeric Preamble Generator) wherein some references are stored which are preamble samples for different phase offset. The information contained in such a read only memory are obtained through an Acquisition block Acc Acq according to the output value of the filter block LF and applied as input to the phase detector block PD through a logic gate receiving also the output of a Target Filter block. The output of the filter block LF is applied to a Digital Phase Interpolator block through a tracking block Acc Trk which is substantially an integrator.

In the described digital PLL the samples are recovered through sample interpolation via digital filtering. The interpolation actuation is provided by the block NPG over the acquisition onset, and reverts to a prior art phase detector over the tracking phase. The PLL loop filter is shared at any time. Assuming that sector user bits are protected by 10% of error correction capability, the coded data size is 512×8×1.1=4506 samples. The overall header is generally about 5%, that is 226 samples.

Figure 4:
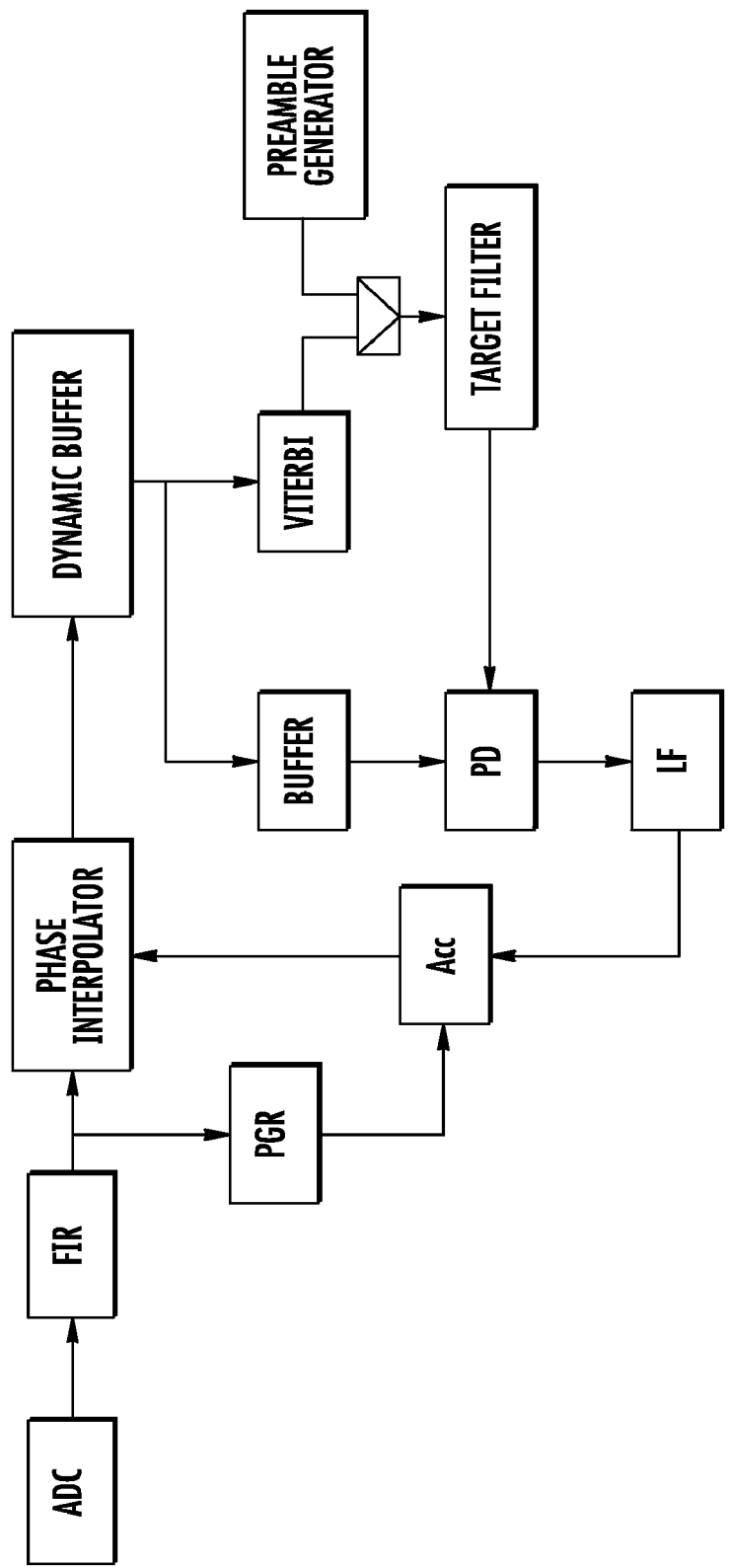
FIG. 4 is a schematic diagram illustrating an alternative approach, known as "Tintoretto", for timing loop recovery in current HDD Read/Write channels.

With the proposed invention simulation results yield a reduction of preamble length corresponding to ~120 samples instead of ~180 of the prior art approaches. This results in an improvement in format efficiency of about 1.2%. On the preamble pattern, the readback signal has a sine wave format and we can perform on this signal onset a preliminary estimate of phase and gain with the PGR block. Respect to the Tintoretto approach (FIG. 4), the block can be moved before FIR, in such a way to reduce the delay for gain propagation. According to the present invention, the signal amplitude is corrected in the analog part.

During acquisition, instead of interpolating the samples to track the timing error-free references, like in the Tintoretto approach, the references follow the ADC samples. In a read only memory (ROM), referred to as NPG (Numeric Preamble Generator), are stored the references, that are preamble samples for different phase offset (typically the step is T/64, where T is the timing interval between two ADC samples). In such a way the phase detector can compare the phase difference between the delayed samples of ADC output and the references scaled in amplitude if that is the case.

This approach halves the latency of the loop respect to the known Tintoretto approach. So it's possible to increase the loop bandwidth in acquisition. The lock is achieved and maintained using a reduced number of preamble samples, with a reliable probability. In other words, the present invention proposes the use of a moving reference, the NPG block, during the acquisition phase. This NPG block drives the same loop of the precision phase shifter provided in the prior Tintoretto approach but with a reduced latency. Since the latency of the NPG block is much reduced with respect to a standard loop, a robust synchronization with only a fraction of the preamble signal pattern is obtained.

Moreover, since the loop stability point does not depend from the transient, it is possible to use the same loop filter used in the tracking phase without any transient in the switching phase. The FIR taps are adapted on the data field. So during acquisition, the FIR coefficients are frozen to the values they reached in the previous sector reading. While calculating the preliminary estimate of phase and gain within the PGR, the FIR can be stimulated by a 4T pattern, to evaluate its gain and phase distortion (Phase Distortion FIR in Eq (1)).

Once it has been fixed the equalization target, gain and phase are calculated on a perfectly equalized preamble pattern according to the following equation (Phase Target in Eq (1)). So during acquisition, the second loop is frozen, but the digital interpolator command follows the following rule:

$$Acc_{Trk}^{(k)} = Phase_{Target} - PhaseDistorsion_{Fir} - Acc_{Acq}^{(k)} - Lat_{FirHr} \times FreqAcc(k) \quad (I)$$

In such a way, while the acquisition loop is working on the preamble pattern, the tracking loop is not acting, but the digital interpolator is controlled by the decisions of the acquisition loop according to Eq (1), where a dynamic compensation of the frequency error multiplied by to the latency fir and interpolator is performed. In such manner, a "future" more stable timing information is applied on "previous" preamble samples via a more reliable interpolator command. It is noted that the acquisition loop must follow the sampling error with high speed and low precision.

Once this first loop ends operation, the second one, with reduced loop gain, can reprocess the 4T samples in the pipeline, allowing a finer correction around the end state of the acquisition. Thus, the tracking loop starts working on the tail of preamble before processing the data samples and takes advantage of more time to track the timing error on a header pattern rich of transition.

Another opportunity should be to close the acquisition loop picking the samples after the FIR filter. In this case the calculation of phase and gain distortion of fir is not necessary, but the delay in the propagation of initial gain estimate is greater. Moreover the second timing loop works on less preamble samples than the inventive approach in FIG. 5 and this situation is less robust in terms of timing recovery.

Figure 7:
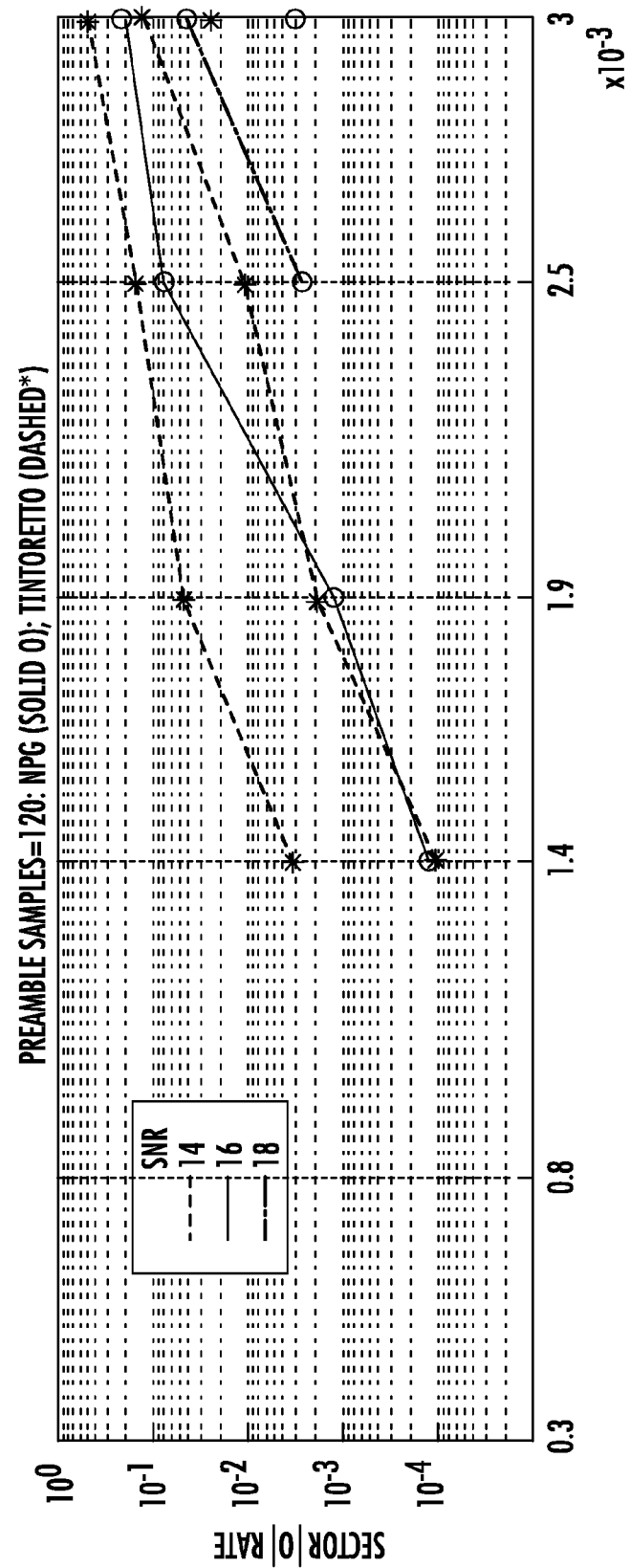
FIG. 7 is a timing diagram illustrating the results of a simulation of the present invention wherein the preamble pattern length includes 120 samples, and in dashed line are represents the results of the prior art approach of FIG. 4.
Figure 8:
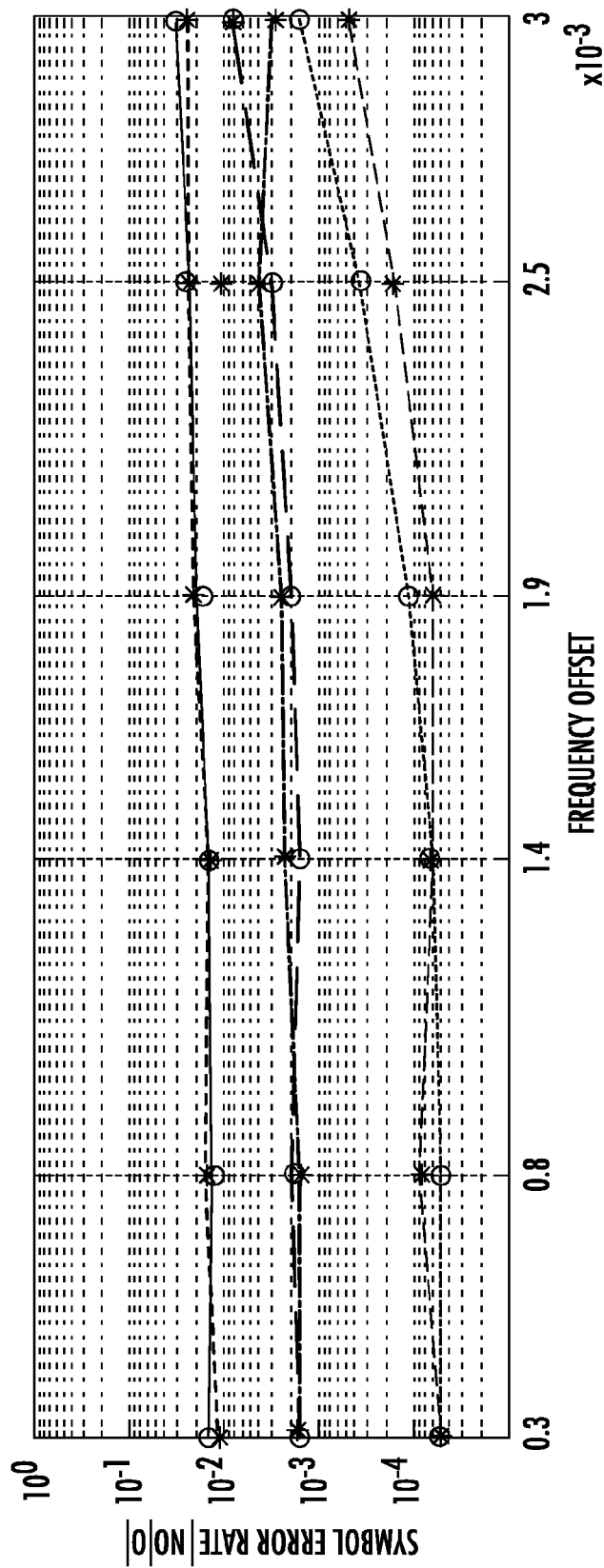
FIG. 8 is another timing diagram showing the results of a simulation wherein the preamble pattern length includes 120 samples.
Figure 9:
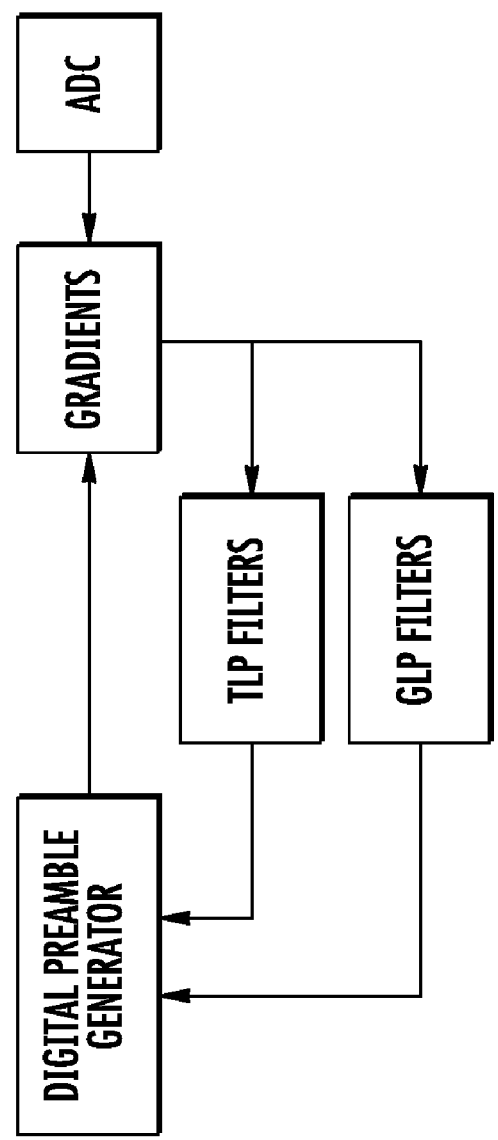
FIG. 9 is a schematic view of the internal structure of a Numeric Preamble Generator (NPG) block included into the architecture of FIG. 5.

The results of simulations are summarized in FIGS. 7 and 8, wherein the preamble pattern length is 120 samples. The preamble samples are depicted and the other parts of the data sector. In acquisition, (A) the block ACC_ACQ works on ADC_OUTPUT; during acquisition (B), the block ACC_TRK is led by ACC_ACQ according Eq. (1); and during tracking, the block ACC_TRK rephases ITR_OUTPUT, the second timing loop will reprocess the preamble samples (C) starting from the reliable state reached by the first loop.

Figure 1:
FIG. 1 is a schematic diagram illustrating the structure of a data sector wherein an information "data" portion is included between additional field.
Figure 3:
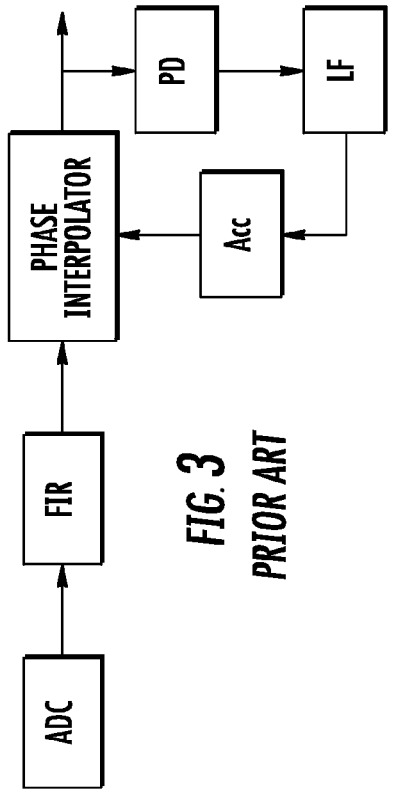
FIG. 3 is a schematic diagram illustrating another prior art architecture for synchronous signal detection wherein recovering of synchronization errors is performed in the reading chain with a digital second order PLL.
Figure 2:
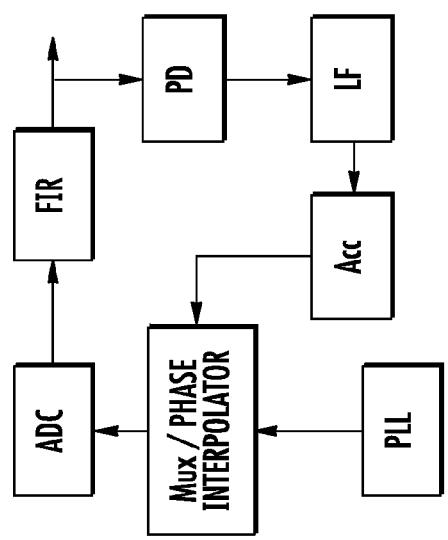
FIG. 2 is a schematic diagram illustrating a prior art architecture for synchronous signal detection including synchronization processing to recover phase and frequency sampling errors wherein tracking of the synchronization error is performed via a PLL that controls an analog to digital converter.

In more detailed, some further advantages of the invention will be described with reference to the drawings figures from 9 to 13. The PGR block can be provided either before or after the FIR filter block. If done before, a compensation may be necessary after taking into account the FIR tap values. However, to avoid such a compensation which is expensive to be implemented in traditional scheme, for instance those of prior art approaches of FIGS. 2 and 3, the inventive approach has been adopted.

Once the phase and gain are estimated by PGR block, a local replica of the signal preamble is generated rather than trying to shift the incoming data with the ITR filter. Unlike forcing a decision by generator, simply using a T/64 resolution supported by the phase command, the invention provides a generator to close the TLP filter in acquisition.

At RG onset, the FIR memory configuration of FIG. 10 is loaded and FIR output calculated. After a cycle, the FIR memory configuration shown in FIG. 11 is loaded and FIR output calculated. Using now these two outputs, the phase and amplitude shift may be measured. After the PGR block, the memory block NPG generates an expected monochromatic replica of the incoming waveform, using phase and gain values inferred from PGR. It is noted that the main latency contribution is now outside this loop.

Loops are mixed back to where they were at the end of the acquisition phase, assuming in fact that acquisition end is nominally when loops are 'almost' done. Thus, both GLP and TLP are close to the steady state, which does not depend on the implementation latency.

That which is claimed is:

1. A method for synchronous detection of a signal in a digital communication system for timing recovery of a sampling phase and frequency synchronization, the signal including a header and data sector having a preamble field and data content field, the method comprising:
    performing a first acquisition process using a preamble signal pattern in the preamble field for generating a timing periodic signal;
    performing a tracking process, for recovering phase, frequency and gain sampling errors of the signal; and
    providing a feedback loop including a phase detector and a numeric preamble generator to reduce latency in the acquisition process, the numeric preamble generator storing preamble values for different phase offsets for calculating errors to drive the phase detector.

2. The method according to claim 1, wherein the acquisition process further comprises correcting the signal amplitude, and the preamble values are based upon analog-to-digital converter samples.

3. The method according to claim 2, wherein the phase detector compares a phase difference between delayed samples of the analog-to-digital converter and the preamble values scaled in amplitude.

4. The method according to claim 1, wherein the tracking process begins operating on an end portion of the preamble signal pattern before processing data samples, and a time to track a timing error on a header is based upon transitions in the header.

5. The method according to claim 1, wherein the acquisition process further comprises maintaining finite-impulse-response (FIR) coefficients at values reached in a previous data sector reading; and further comprising calculating a preliminary estimate of phase and gain within a programmable block, and stimulating a FIR filter with the preamble pattern to evaluate gain and phase distortion.

6. A method for timing recovery of a sampling phase and frequency synchronization of a signal in a digital communication system, the signal including a header and data sector having a preamble field and data content field, the method comprising:

generating a timing periodic signal based upon a preamble signal pattern during an acquisition process, including providing a feedback loop including a phase detector and a numeric preamble generator, the numeric preamble generator storing preamble values for different phase offsets for calculating errors to drive the phase detector; and recovering phase, frequency and gain sampling errors of the signal during a tracking process.

7. The method according to claim 6, wherein the acquisition process further comprises correcting the signal amplitude in the feedback loop, and the preamble values are based upon analog-to-digital converter samples.

8. The method according to claim 7, wherein the phase detector compares a phase difference between delayed samples of the analog-to-digital converter and the preamble values.

9. The method according to claim 6, wherein the tracking process begins operating on an end portion of the preamble signal pattern before processing data samples, and a time to track a timing error on a header is related to transitions in the header.

10. The method according to claim 6, wherein the acquisition process further comprises maintaining finite-impulse-response (FIR) coefficients at values reached during reading of a previous data sector; and further comprising calculating a preliminary estimate of phase and gain within a programmable block, and stimulating a FIR filter with the preamble pattern to evaluate gain and phase distortion.

11. A signal detection unit for synchronization processing to recover phase and frequency sampling errors of a communicated signal, and comprising:

an analog to digital converter (ADC), receiving the signal to be detected;

a digital finite impulse response (FIR) filter, downstream from the ADC, for performing an equalizing phase;

a Dynamic Buffer;

a Digital Phase Interpolator downstream of the FIR filter for producing an output for the Dynamic Buffer;

a phase detector;

a memory storing preamble values for different phase offsets provided to calculate errors for driving the phase detector;

an integrator that drives the output of the memory; and a programmable block for performing an estimation of phase and gain having an output applied as input to the integrator.

12. The signal detection unit according to claim 11, further comprising a feedback loop including said phase detector, said memory, the integrator and a filter block, and wherein the preamble values stored in the memory are obtained through the integrator according to an output value of the filter block which is downstream from the programmable block.

13. The signal detection unit according to claim 12, further comprising a target filter block downstream from the dynamic buffer, and a logic gate receiving an output of the target filter block; wherein an output of the memory is applied as input to the phase detector via the logic gate.

14. The signal detection unit according to claim 12, further comprising a tracking block; and wherein an output of said filter block is applied to said Digital Phase Interpolator through the tracking block.

* * * * *

UNITED STATES PATENT AND TRADEMARK OFFICE
CERTIFICATE OF CORRECTION

PATENT NO. : 7,446,968 B2
APPLICATION NO. : 11/188391
DATED : November 4, 2008
INVENTOR(S) : Davide Giovenzana, Angelo Dati and Augusto Andrea Rossi It is certified that error appears in the above-identified patent and that said Letters Patent is hereby corrected as shown below:

| | |
|---|---|
| Title page, Item (73) Assignee: | Delete: "S.r.L." Insert: --S.r.l.-- |
| Title page, Item (56) Other Publications: | Delete: "Communicaitons" Insert: --Communications-- |
| Column 1, Line 35 | Delete: "refer the" Insert: --refer to the-- |
| Column 2, Line 37 | Delete: "know" Insert: --known-- |
| Column 3, Line 16 | Delete: "the a known" Insert: --the known-- |
| Column 3, Line 51 | Delete: "line are" Insert: --line-- |
| Column 5, Equation I | Delete: "PhaseDistorsion" Insert: --PhaseDistortion-- |
| Column 6, Line 3 | Delete: "according Eq." Insert: --according to Eq.-- |

UNITED STATES PATENT AND TRADEMARK OFFICE
CERTIFICATE OF CORRECTION

PATENT NO.        : 7,446,968 B2
APPLICATION NO.   : 11/188391
DATED             : November 4, 2008
INVENTOR(S)       : Davide Giovenzana, Angelo Dati and Augusto Andrea Rossi It is certified that error appears in the above-identified patent and that said Letters Patent is hereby corrected as shown below:

Column 6, Line 7        Delete: "detailed"
                        Insert: --detail--

Signed and Sealed this

Twenty-fourth Day of February, 2009

JOHN DOLL
*Acting Director of the United States Patent and Trademark Office*